United States Patent [19]

Bulatovic et al.

[11] Patent Number: 4,952,329

[45] Date of Patent: Aug. 28, 1990

[54] SEPARATION OF POLYMETALLIC SULPHIDES BY FROTH FLOTATION

[75] Inventors: Srdjan Bulatovic; Robert S. Salter, both of Peterborough, Canada

[73] Assignee: Falconbridge Limited, Toronto, Canada

[21] Appl. No.: 400,224

[22] Filed: Aug. 29, 1989

Related U.S. Application Data

[62] Division of Ser. No. 192,567, May 11, 1988, Pat. No. 4,880,529.

[51] Int. Cl.[5] ........................ B03D 1/016; C07G 1/00; C08B 37/00; C08B 30/18

[52] U.S. Cl. ........................................ 252/61; 209/167; 527/400; 530/500; 530/505; 536/4.1; 536/114; 536/103

[58] Field of Search ................ 527/400; 530/500, 505; 536/4.1, 114, 103; 252/61; 209/166, 167

[56] References Cited

U.S. PATENT DOCUMENTS

| | | | |
|---|---|---|---|
| 1,622,127 | 3/1927 | Atkinson | 536/103 |
| 1,741,028 | 12/1929 | Koenig | 209/167 |
| 2,019,306 | 10/1935 | Handy | 209/167 |
| 2,070,076 | 2/1937 | Brown | 209/167 |
| 2,471,384 | 5/1949 | Booth | 209/167 |
| 2,919,802 | 1/1960 | Drake | 209/167 |
| 3,912,623 | 10/1975 | Buza | 209/167 |
| 4,246,096 | 1/1981 | Bulatovic | 209/167 |
| 4,514,292 | 4/1985 | Burdick | 209/167 |
| 4,576,708 | 3/1986 | Oko | 208/408 |
| 4,702,824 | 10/1987 | Abadi | 209/167 |
| 4,880,529 | 11/1989 | Bulatovic et al. | 209/167 |

*Primary Examiner*—David L. Lacey
*Assistant Examiner*—Thomas M. Lighgow
*Attorney, Agent, or Firm*—Rogers, Bereskin & Parr

[57] ABSTRACT

A new depressant composition is provided for the enhanced separation into separate value metal concentrates of copper, nickel, zinc, lead present in polymetallic and massive sulphide ores.

The depressant is added in an aqueous solution prepared by dissolving first a mixture of quebrachio and dextrin, or quebracho and guar gum. To the solution of modified quebracho a water soluble salt of lignin sulphonate is added. The aqueous polymer of modified quebracho lignin sulphonate is further mixed with one or more of the following inorganic reagents: water soluble cyanide, metal sulphates and water soluble sulphites. The resulting depressant is added together with conventional flotation reagents in conventional mineral separation stages as required.

6 Claims, 1 Drawing Sheet

SEPARATION OF POLYMETALLIC SULPHIDES BY FROTH FLOTATION

Figure 1:
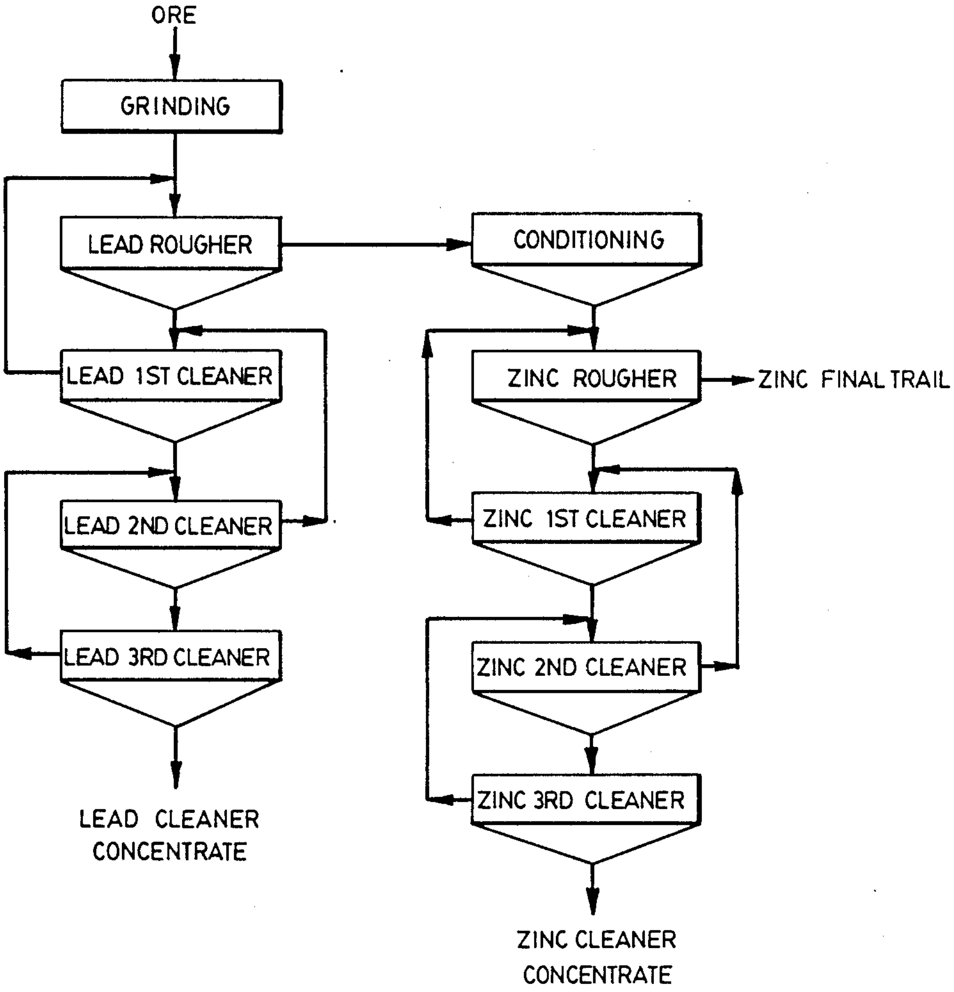

This is a division of application Ser. No. 192,567 filed May 11, 1988 now U.S. Pat. No. 4,880,529.

This invention relates to the separation of sulphidic minerals by froth flotation in a mineral separation process. More particularly this invention relates to the separation of sulphidic minerals present in polymetallic sulphides by differential froth flotation.

Froth flotation is a well-known mineral processing operation for obtaining mineral concentrated of a desired compound or element. In this process a collector agent is added to the aqueous slurry of the ground ore. The collector agent for a particular mineral is preferentially adsorbed on the surface of the mineral particles containing the desired compound, thereby rendering the surface hydrophobic (non-wetting by water). In a flotation device and in the presence of a frothing agent, air bubbles will be attached to the particles of the desired mineral thereby lifting them to the surface of the slurry. The froth in most instances is collected by mechanical means. The separated froth is usually dried or dewatered, and the concentrate is treated in subsequent steps to recover the desired compound or element.

In addition to collector and frothing agents being added to an ore slurry in the mineral separation process, it is usual to add depressant agents, which will be adsorbed on the surface of particles containing unwanted compounds. The surface of the particles are thereby rendered wettable, i.e., hydrophillic and hence not flotable. The unwanted minerals may contain minerals bearing certain compounds which are to be recovered by subsequent flotation process steps, by means of additions of a collector agent specific to such a mineral. When two or more flotation circuits are operated sequentially to selectively separate desired compounds present in ores, the process is referred to as differential flotation.

The usual practice of differential flotation is to treat the ore pulp similarly to a single flotation circuit but with reagents which will permit the flotation of only one of the desired minerals by preventing or minimizing flotation of other minerals. The residue from the first flotation stage is then treated with one or more chemical reagents to bring about flotation and concentration of a second mineral. In the second flotation process the desired minerals contained in the froth will provide a concentrate of minerals which have been separated from the minerals contained in the concentrate of the first flotation step. The residue or tailing of the second flotation process step thus will contain the unwanted minerals separated from the two desired minerals present originally in the ore. Of course, more than two flotation process circuits may be introduced sequentially to result in more than two concentrated of compounds and minerals which are of use to the mineral processor.

The concentrates obtained still contain unwanted compounds, but have been substantially enriched in the desired compound or element, thereby reducing the cost of further recovery steps. It is customary to refer to the compound of metals in an ore which are to be recovered from the ore under treatment as value metals.

Massive sulphidic ores usually contain sulphides of three or more metals which are to be separated and recovered by separate process steps. Most massive sulphides contain iron sulphides which are intimately mixed and disseminated throughout the ore. The iron sulphides, quartz, silicates, are usually of no value to the metallurgist and are to be separated from the value metals and discarded. It is of great significance for economical metal recovery, that the value metals be separated into concentrates of specific metals at the early stages of the metal recovery process. The separation of value metals into concentrates is often conducted by differential flotation circuits and the final tailing, or the combined tailing of differential flotation circuits will be separated and discarded as containing various gangue minerals.

The differential flotation is usually achieved with additions of various inorganic and organic chemicals called modifiers and depressants which alter the surfaces and flotation properties of the sulphides which need to be separated. There are known collector agents for the flotation separation of copper, nickel, zinc, lead, contained in sulphidic ores but these may not be selective enough, often allowing significant portions of one value metal retained in the concentrate of another value metal. In other words, the selectivity of the collector agent is not sufficiently high. There are known depressant agents which may increase the selectivity of a collector agent, but the improvement may still not be sufficient to render the separation process economical. It may often happen that a collector-depressant combination may provide good separation in one type of sulphidic ore, but will be much less effective in the case of sulphidic ore of a different origin and nature.

By way of illustration of lack of selectivity, various sulphates of heavy metals such as zinc sulphate as well as cyanide, are used for the depression of sphalerite (ZnS) during the differential flotation of copper-zinc sulphides or copper-lead-zinc sulphidic ores. Cyanide and lime are used to separate chalcopyrite from pentlandite. In actual practice, even with additions of known depressants the sharpness of separation in complex ores of lead, copper, zinc from iron sulphides, copper-zinc sulphides or copper-nickel sulphides is often poor and results in losses in mineral values thereby substantially increasing the cost of the recovery process.

There is a need for a depressant agent which will increase the selectivity of known collector agents in the differential flotation separation of complex sulphidic ores containing copper sulphides as well as lead, zinc, and iron sulphides intimately mixed with each other.

There is also a need for a depressant agent which will increase the selectivity of known collector agents in the differential flotation separation of value metals contained in mixed sulphidic ores containing copper-nickel-iron, or copper-zinc-iron.

A new depressant has been found for the enhanced separation of metal sulphides contained in mixed polymetallic sulphidic ores consisting of:

(i) quebracho chemically reacted with one of the group consisting of: guar gum, and dextrin.

(ii) a water soluble salt of lignin sulphonate; and (iii) at least one of the group consisting of
- alkali metal cyanide,
- alkaline earth metal cyanide,
- water soluble metal sulphate , and
- a water soluble metal sulphite containing a tetravalent sulphur atom.

FIG. 1 is a schematic flowsheet representing a differential flotation separation process.

A detailed description of the preferred embodiment of the invention will be provided hereinbelow and illustrated by means of working examples. The examples will refer to the flowsheet of FIG. 1.

Quebracho is a wood extract obtained from trees by known means. It is known to use quebracho as a flotation reagent by itself and without chemically bonding it to other compounds.

The new depressant agent for use in flotation separation of polymetallic sulphidic minerals is based on a chemical compound obtained by chemically reacting quebracho and dextrin or guar gum. Quebracho is a high tannin bearing natural product and its structure may be represented schematically as shown below;

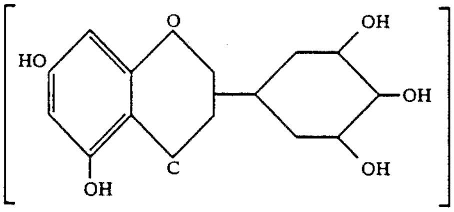

Dextrin is a water soluble polymeric starch gum, its molecular weight is not definable within a strict limit. It has the general formula of $(C_6H_{10}O_5)_n$. It is believed that when quebracho and dextrin are reacted the phenolic OH groups of the phenolic nuclei of quebracho are bonded to dextrin.

Guar gum is also a natural product, it has sugar-type components such as mannose and galaotose, probably combined in a polysaccharide. It is believed that the nature of the reaction between quebracho and guar gum can be considered to be similar to the hydroxide group bondings between quebracho and dextrin.

The quebracho based reaction product is further combined in a second reaction with a lignin sulphonate salt of an alkali metal or water soluble alkaline earth metal, resulting in a water soluble complex polymeric compound containing dextrin or guar gum modified quebracho and lignin sulphonate. This complex polymer will be referred to in further discussions as LS compound In a third process step in the preparation of the depressant agent of this invention, the LS polymer is partially monomerized by the addition of at least one of the following chemical reagents: alkali metal cyanide, water soluble alkaline earth metal cyanide, a metal sulphate either by itself or complexed with cyanide, and water soluble sulphite. For the sake of clarity, sulphites are inorganic compounds containing a metal ion and a $SO_3{=}$ radical. The sulphur in the sulphite radical is tetravalent. The LS compound depending on which of the above listed reagents is utilized in monomerizing it will be referred to as a member of the LS series. For example, LS7 is an LS compound reacted with an alkali metal cyanide; specifically with sodium cyanide. LS8 is an LS compound which has been reacted with a zinc sulphate/sodium cyanide complex.

The LS series are added to the aqueous slurry or pulp of the polymetallic sulphidic mineral containing other mineral processing reagents at a rate of 50 g/t to 350 g/t, depending on the nature and type of the ore.

The polymetallic sulphidic ore is usually ground to a particle size which will allow the liberation of the desired metallic sulphides. The grinding may be wet or dry. The ground ore is usually slurried in water. The aqueous ore slurry or pulp is then conditioned by additions of conventional reagents such as pH modifiers, slime depressants and similar agents to render the surface of the ore particles receptive to collector agents and depressant agents. The addition of conditioning agents, depressants and collector agents, and frothing agents may take place in a single stage or in several subsequent stages. The agents may also be added in the wet grinding step if it is so desired. Additions of the depressant LS are usually made to the grinding and subsequent crude concentrate flotation stages. The flotation of value metal bearing minerals is carried out using conventional equipment and methods.

The depressant of the present invention improves the selective flotation separation of copper-zinc sulphide ores, copper-lead-zinc sulphidic ores, lead-zinc and copper-nickel sulphides. The LS depressants, as discussed above, are reaction products of quebracho, guar gum or dextrin with lignin sulphonate further reacted with selected inorganic compounds. The depressant is believed to form complexes in the form of monomers and these exhibit characteristics of selective and powerful depressants for specific minerals while they do not affect the flotability of other minerals. The reactions in the ore are believed to be complex and involve interaction of the organic radicals contained therein with the mineral particles.

The preparation of the depressant and the application of the depressant agent in the flotation separation of copper-zinc minerals, copper-nickel minerals, lead-zinc minerals and other massive sulphidic ores containing iron sulphides are described in the following examples.

EXAMPLE 1

This example provides a description for the Preparation of an LS compound referred to hereinabove.

Dextrin and quebracho were mixed as solids in a ratio of $2\pm0.4:1\pm0.4$ and dissolved in water to provide an aqueous solution in the of range 5–10 weight percent solid content. It is advisable that the dissolution takes place at above 40° C. To this warm solution was added calcium lignin sulphonate in an amount such that the weight of calcium lignin sulphonate to the weight of quebracho +dextrin was 3:8. It is to be understood that if another water soluble salt of lignin sulphonate is to be substituted for the calcium salt, adjustment to the weight ratio is required.

The third component of the depressant was added as a solid to the prepared solution containing dextrin modified quebracho lignin sulphonate. In this example the LS8 depressant was prepared, wherein the third component is a sodium cyanide-zinc sulphate mixture in a solid weight ratio of around 3:1. The total weight of the third component to be added in the case of the LS8 depressant is equal to the weight of quebracho-dextrin mixture first dissolved in the solution. The resulting solution then contained the following solids:

quebracho-dextrin (1:2); 42 wt. % as solid
calcium lignin sulphonate 16 wt. % as solid
sodium cyanide-zinc sulphate (3:1); 42 wt. % as solid In the LS 7 depressant sodium cyanide replaces the zinc sulphate in the mixture. The weight in the total amount of sodium cyanide added to maintain the above ratio needs to be adjusted in this case. Similarly, if another alkali metal cyanide is used to make up the LS7 or LS8 depressant, the weight requirement of the reagent needs to be adjusted to the change in the atomic weight of the alkali metal forming the cyanide, as a person skilled in the art will appreciate.

Suitable adjustments in the ratios need to be made if guar gum is to replace the dextin used for modifying quebracho.

In using the LS depressant in the flotation separation of sulphidic minerals, the rate of addition of the depressant was calculated based on the solid content of the solution prepared as described above.

EXAMPLE 2

A massive sulphidic ore from Canada which is utilized in a commercial operation for the recovery of copper, zinc and silver as major value metals, was treated in a laboratory flotation circuit using conventional flotation reagents. The ore contained the usual gangue minerals such as quartz, pyrite and minor amounts of pyrrhotite. The major difficulty in treating this ore is that the copper concentrate obtained is contaminated with zinc minerals. Using conventional zinc depressant in a flotation separation step, satisfactory separation of the value metals was not possible.

In this example, laboratory tests were conducted in continuous locked cycles on two types of ores; that is, the intermediate product in the flotation stages were recycled in order to simulate a commercial flotation plant flowsheet which incorporates several flotation stages.

The beneficiation process included the following flotation treatment steps:

(a) Grinding of the ore to obtain 80% less than 325 Tyler mesh (53 μm) in the presence of lime as pH modifier, which was added at a rate of 200–400 g/t. Sodium cyanide (NaCN) for depressing zinc minerals and pyrite was added to the ore at the rate of 20–40 g/t.

(b) The slurry of the ground ore obtained in the grinding step was further conditioned with sulphur dioxide, for the depression of zinc at a rate of 400–750 g/t. The copper was then recovered by adding collector agent. Cyanamid R208* (phosphate base) and Cyanamid 3418A* (phosphine base). The frothing agent used was MIBC (methylisobutyl carbinol). The crude copper concentrate was cleaned three times, i.e. in three separate stages, with extra additions of sulphur dioxide and frother MIBC. The composition of the final copper concentrate obtained using the simulated commercial plant flowsheet is shown in the following tables as copper cleaner concentrate (Cu Clean. Conc.).

*Trade name (c) The copper final tailing was subsequently treated to recover the zinc using a conventional lime-copper sulphate conditioning circuit. The zinc minerals contained in the copper tailing were conditioned by agitation with lime and copper sulphate additions at an alkaline pH. The zinc sulphides were then recovered by a second froth flotation step using a conventional enthate collector agent known as Cyanamid A317* and frothing agent polyglycol ester, commercially known as Dow-DF-250.*

*Trade name

The metallurgical results obtained in the separation Process for two ore types; ore A which is high in copper, and ore B which is relatively low in copper content, and using the described conventional procedure and conventional reagents are shown in Table 2.

*Trade name

TABLE 2

| Ore Type | Product | Weight % | Assays, %, Cu | Zn | g/t Ag | % Distribution Cu | Zn | Ag |
|---|---|---|---|---|---|---|---|---|
| A | CuClean. Conc. | 16.55 | 23.9 | 3.29 | 257 | 97.1 | 11.1 | 88.4 |
| (High Copper) | Zn Conc. | 7.20 | 0.46 | 58.9 | 30.2 | 0.8 | 86.7 | 4.5 |
| | Final Tail. | 76.25 | 0.07 | 0.14 | 4.5 | 2.1 | 2.2 | 7.1 |
| | Head | 100.00 | 4.05 | 4.89 | 48.1 | 100.0 | 100.0 | 100.0 |
| B | CuClean. Conc. | 10.54 | 23.3 | 3.36 | 317 | 96.7 | 8.9 | 77.4 |
| (Low Copper) | Zn Conc. | 6.92 | 0.40 | 49.8 | 4.1 | 1.1 | 87.0 | 6.6 |
| | Final Tail. | 82.54 | 0.063 | 0.20 | 8.4 | 2.2 | 4.1 | 16.0 |
| | Head | 100.00 | 2.54 | 3.96 | 43.1 | 100.0 | 100.0 | 100.0 |

EXAMPLE 3

Laboratory locked cycle tests conducted in steps described in the previous paragraph as steps (a), (b), (c), were carried out but with additions of zinc depressant LS8 of the present invention to increase the separation of the zinc sulphide from the copper sulphide and silver containing fractions. The depressant was added to the ore in the wet grinding step and then later to the copper cleaner flotation stage. The overall addition of depressant LS8 was 170 g/tonne. The results of the flotation tests obtained with depressant LS8 are shown in Table 3.

TABLE 3

| Ore Type | Product | Weight % | Assays, %, Cu | Zn | g/t Ag | % Distribution Cu | Zn | Ag |
|---|---|---|---|---|---|---|---|---|
| A | Cu Clean. Conc. | 14.16 | 27.5 | 1.71 | 295. | 97.0 | 4.8 | 87.4 |
| (High Copper) | Zn Conc. | 7.63 | 0.66 | 59.3 | 31.7 | 1.2 | 91.6 | 5.1 |
| | Final Tail. | 78.20 | 0.09 | 0.23 | 4.6 | 1.8 | 3.6 | 7.5 |
| | Head | 100.00 | 4.02 | 4.95 | 48.0 | 100.0 | 100.0 | 100.0 |
| B | Cu Clean. Conc. | 8.22 | 29.3 | 0.99 | 362. | 96.1 | 2.0 | 74.8 |
| (Low Copper) | Zn Conc. | 6.63 | 0.48 | 56.7 | 38.0 | 1.3 | 92.8 | 6.3 |
| | Final Tail. | 85.15 | 0.08 | 0.25 | 8.8 | 2.7 | 5.2 | 18.9 |
| | Head | 100.00 | 2.51 | 4.05 | 39.7 | 100.0 | 100.0 | 100.0 |

By comparing the flotation test results in Table 2 and 3, it is clearly observable that the additions of depressant LS8 of this invention has significantly improved zinc rejection from the copper concentrate. The rejection of iron sulphides with other gangue minerals has also been improved, as is shown by the increase in weight percent of the final tailing. The zinc sulphides that have been rejected from the copper concentrate were recovered in a second flotation recovery stage produced significantly higher zinc recovery. More zinc retained in the zinc concentrate obtained improved the economics of the entire process.

EXAMPLE 4

The ore treated in Examples 2 and 3 in laboratory tests, was treated in a commercial plant operating at a rate of 130 tonnes per hour. The following reagents were used in the operating plant.

Grind 80% less than 325 Tyler mesh
Copper Circuit:
pH Modifier: $Ca(OH)_2$ =300 g/t
Depressants:
NaCN =20 g/t
$SO_2$ =700 g/t
Collectors:
Aeroflot (R208)* =40 g/t
Aerophine (3418A)* =20 g/t
Frother: MIBC 20 g/t
Zinc Circuit:
pH Modifier $Ca(OH)_2$ =120 g/t
Zn Activator $CuSO_4 \times 5H_2O$ =400 g/t
Collector: Xanthate (A317)* 30 g/t
Frother: DF250** =15 g/t

* Trade name of Cyanamid collector
** Trade name of Dow Chemical frother

The typical results obtained in the continuous plant operation are shown in Table 4.

TABLE 4

| Product | Weight % | Assays, %, Cu | Zn | g/t Ag | % Distribution Cu | Zn | Ag |
|---|---|---|---|---|---|---|---|
| Cu Concentrate | 15.0 | 24.5 | 3.12 | 359.0 | 95.7 | 8.9 | 78.0 |
| Cu Tailing | 85.0 | 0.19 | 5.60 | 17.8 | 4.3 | 91.1 | 22.0 |
| Zn Concentrate | 8.1 | 0.68 | 52.40 | 50.6 | 1.4 | 81.0 | 5.9 |
| Zn Tailing | 77.2 | 0.13 | 0.70 | 14.4 | 2.9 | 10.1 | 16.1 |
| Feed | 100.0 | 3.82 | 5.18 | 69.3 | 100.0 | 100.0 | 100.0 |

*Trade name of Cyanamid collector
**Trade name of Dow Chemical frother

EXAMPLE 5

The ore utilized in examples 2, 3 and 4 was treated in the same manner as is described in Example 4, in a parallel commercial circuit treating ore at the rate of 130 tonnes per hour, but with depressant LS8 added at a rate of 40 g/t in the grinding step and 30 g/t in the copper cleaner stage. Cyanide was omitted as a conditioning agent from the circuit, but was added as being incorporated in the third component sodium cyanide/-zinc sulphate complex, of the depressant LS8, as described in example 1. Cyanide added in this form is complexed with zinc, whereas the addition of sodium cyanide directly as a conditioner results in the presence of unbound cyanide ions. The results obtained with the use of LS8 depressant are shown in Table 5.

TABLE 5

| Product | Weight % | Assays, %, Cu | Zn | g/t Ag | % Distribution Cu | Zn | Ag |
|---|---|---|---|---|---|---|---|
| Cu Concentrate | 14.2 | 26.1 | 2.40 | 406 | 95.1 | 6.6 | 77.6 |
| Cu Tailing | 85.8 | 0.20 | 5.66 | 19.4 | 4.9 | 93.4 | 22.4 |
| Zn Concentrate | 8.0 | 0.51 | 54.50 | 46.8 | 1.0 | 83.8 | 5.0 |
| Zn Tailing | 77.8 | 0.19 | 0.64 | 15.7 | 3.9 | 9.6 | 17.4 |
| Feed | 100.0 | 3.82 | 5.18 | 69.3 | 100.0 | 100.0 | 100.0 |

As can be seen from the results shown in Tables 4 and 5, the use of zinc sulphide depressant LS8 resulted in reducing the distribution of zinc separated with the copper concentrate by 2.3% and improved both the copper concentrate grade and the zinc recovery in the zinc circuit by about 2% or more. In economic terms the values of both the copper and zinc concentrates were improved considerably.

EXAMPLE 6

A massive sulphide ore originating in British Columbia (Canada), containing copper, nickel, platinum and palladium as major value metals was treated in a laboratory batch flotation circuit using the following conventional reagents:

Grind: 95% less than 200 Tyler mesh
Copper Circuit:
pH Modifier: Lime $Ca(OH)_2$=1000 g/t
Ni Depressant: Sodium Cyanide (NaCN) 50 g/t
Collector: M2030* =10 g/t
Frother: MIBC 5 g/t
Pyrite Depressant: $SO_2$=450 g/t
Nickel Circuit:
pH Modifier: $Na_2CO_3$ =800 g/t
Zn Activator: $CuSO_4 \times 5H_2O$ =100 g/t
Collector: A350** =50 g/t
Frother: Pine Oil =20 g/t

* Cyanamid collector trade name
** Minerec collector trade name

The results obtained when using the above conventional reagents are shown in Table 6.

TABLE 6

| Product | Weight % | Assays, % Cu | Ni | g/t Pt | Pd | % Distribution Cu | Ni | Pt | Pd |
|---|---|---|---|---|---|---|---|---|---|
| Cu Clean. Conc. | 2.90 | 20.0 | 1.30 | 6.5 | 4.3 | 68.2 | 5.2 | 15.7 | 15.8 |
| Cu Ro. Conc. | 6.90 | 9.25 | 1.40 | 4.54 | 6.30 | 75.1 | 14.0 | 31.6 | 34.9 |
| Ni Clean. Conc. | 9.60 | 1.48 | 4.54 | 6.3 | 3.13 | 16.7 | 63.2 | 50.4 | 38.1 |
| Ni Ro. Conc. | 12.77 | 1.37 | 4.01 | 5.16 | 3.08 | 20.7 | 74.4 | 55.0 | 49.8 |
| Ni Flot. Tail. | 80.33 | 0.045 | 0.10 | 0.20 | 0.15 | 4.2 | 11.6 | 13.4 | 15.3 |
| Feed | 100.0 | 0.85 | 0.69 | 1.20 | 0.79 | 100.0 | 100.0 | 100.0 | 100.0 |

TABLE 8-continued

| Product | Weight % | Assays, % Cu | Ni | % Distribution Cu | Ni |
|---|---|---|---|---|---|
| Feed | 100.00 | 5.01 | 0.48 | 100.0 | 100.0 |

*Cyanamid trade name for xanthate collectors

EXAMPLE 7

The same ore as used in the conventional tests was treated in the same manner and under similar circumstances as described above, but without direct additions of sodium cyanide conditioner. Cyanide in this experiment was replaced by depressant LS8 prepared according to Example 1, and was added at a rate of 100 g/t to the grinding operation and 20 g/t to the copper cleaner circuit. The results obtained are shown in Table 7.

TABLE 7

| Product | Weight % | Assays, % Cu | Ni | g/t Pt | Pd | % Distribution Cu | Ni | Pt | Pd |
|---|---|---|---|---|---|---|---|---|---|
| Cu Clean. Conc. | 2.84 | 23.5 | 0.25 | 10.4 | 5.2 | 77.6 | 1.0 | 24.8 | 18.4 |
| Cu Ro. Conc. | 4.32 | 17.8 | 0.27 | 9.3 | 4.8 | 89.4 | 1.7 | 33.7 | 25.9 |
| Ni Clean. Conc. | 7.81 | 0.55 | 7.07 | 6.41 | 5.20 | 5.0 | 80.0 | 42.1 | 50.7 |
| Ni Ro. Conc. | 9.92 | 0.56 | 6.13 | 6.23 | 4.59 | 6.5 | 87.1 | 51.1 | 56.9 |
| Ni Flot. Tail. | 85.76 | 0.041 | 0.09 | 0.21 | 0.16 | 4.1 | 11.2 | 15.2 | 17.2 |
| Feed | 100.00 | 0.86 | 0.69 | 1.19 | 0.80 | 100.0 | 100.0 | 100.0 | 100.0 |

The results shown in Table 6 and Table 7 clearly demonstrate the enhanced separation of nickel from copper obtained with the use of depressant LS8 of the present invention in the selective flotation of a copper-nickel sulphide bearing ore. With additions of conventional depressants, copper values were also depressed with the nickel as shown in Table 6, resulting in low copper recovery. In the same tests, about 14% of the total nickel reported to the copper rougher concentrate. With the use of depressant LS8 (Table 7) the nickel reporting to the copper rougher concentrate was only 1.7% and the copper recovery was increased to 89.4%. 77.6% of the total copper present in the ore was recovered due to the improved separation in the copper cleaner concentrate, while nickel recovery in the nickel cleaner concentrate was increased from 63.2% to 80.0% with the use of LS8 depressant. It should be added that platinum and palladium recovery was also improved.

EXAMPLE 8

Another ore containing copper-nickel sulphides from Northern Ontario (Canada) having high copper value, was treated in conventional batch laboratory circuit using the following commercial reagents:

Grind: 55% minus 200 Tyler mesh

Copper Circuit:

- pH Modifier $Ca(OH)_2$=700 g/t
- Ni Depressants: Cyanide (NaCN) =150 g/t
- Collectors: A325* =50 g/t
- Frother: MIBC =20 g/t Nickel Circuit: pH Modifier $H_2SO_4$ =200 g/t

- Ni Activator $CuSO_4 \times 5H_2O$ =100 g/t
- Collector: A317* =40 g/t
- Frother: MIBC =5 g/t

* Cyanamid trade name for xanthate collectors

Results obtained using the above procedure are shown in Table 8.

TABLE 8

| Product | Weight % | Assays, % Cu | Ni | % Distribution Cu | Ni |
|---|---|---|---|---|---|
| Cu Clean. Conc. | 17.53 | 26.0 | 1.20 | 91.0 | 43.8 |
| Cu Ro. Conc. | 26.22 | 18.3 | 1.35 | 95.8 | 73.7 |
| Ni Clean. Conc. | 6.31 | 2.01 | 1.28 | 2.5 | 16.9 |
| Ni Ro. Conc. | 8.51 | 1.71 | 1.17 | 2.9 | 20.8 |
| Ni Ro. Tail. | 65.27 | 0.10 | 0.04 | 1.3 | 5.5 |

EXAMPLE 9

The ore containing copper-nickel sulphides used in the conventional tests was treated in a same manner as described in the previous paragraph but omitting addition of cyanide conditioner and adding 150 g/t depressant LS8 instead of cyanide, in the copper circuit. The results obtained in this experiment are shown in Table 9.

TABLE 9

| Product | Weight % | Assays, % Cu | Ni | % Distribution Cu | Ni |
|---|---|---|---|---|---|
| Cu Clean. Conc. | 15.77 | 29.0 | 0.23 | 91.1 | 7.7 |
| Cu Ro. Conc. | 26.81 | 17.9 | 0.28 | 95.6 | 16.0 |
| Ni Clean. Conc. | 3.56 | 2.85 | 8.98 | 2.0 | 68.1 |
| Ni Ro. Conc. | 5.20 | 2.29 | 7.07 | 2.4 | 78.3 |
| Ni Ro. Tail. | 67.99 | 0.15 | 0.04 | 1.3 | 5.5 |
| Feed | 100.00 | 5.02 | 0.47 | 100.0 | 100.0 |

As can be seen from the results shown in Table 8 and 9, the depressant LS8 improved the copper-nickel selectively very noticeably, leading to an increase of nickel recovery in the cleaner concentrate from 16.9% to 68.1%. There was also improvement in the cleaner concentrate grades.

Examples 6 to 9 demonstrate that depressant LS8 can successfully be used for nickel depression during the selective flotation of copper-nickel sulphidic ores.

EXAMPLE 10

A massive sulphide ore containing lead and zinc as major value metals was treated in a laboratory flotation circuit using conventional reagents employed in the commercial plant operation. The major difficulty in treating this ore was that pyrite in the ore was so active that production of a lead concentrate with a commercially acceptable iron sulphide level was not attainable.

In this example laboratory tests were run in a closed circuit operation such that the commercial plant operation was simulated. A closed circuit operation is operated by recirculating the intermediate products as shown schematically in the flowsheet of FIG. 1. The reagents used in the circuit were as follows:

Grind: 65% passing 200 Tyler mesh

Lead Flotation Circuit:

- pH Modifier and pyrite depressant: Lime $Ca(OH)_2$ =750 g/t
- Collectors: Sodium Amylxanthate =30 g/t
- Frother: MIBC =15 g/t Zinc Flotation Circuit:

pH Modifier and pyrite depressant: Lime $Ca(OH)_2$ =3500 g/t

Sphalerite Activator: $CuSO_4 \times 5H_2O$ =600 g/t

Collector: Sodium Amylxanthate =60 g/t

Frother: MIBC =10 g/t

The zinc flotation step was conducted on the lead rougher tailing as shown in FIG. 1.

The metallurgical results obtained in the conventional procedure are shown in Table 10.

TABLE 10

| Product | Weight % | Assays, % Pb | Assays, % Zn | % Distribution Pb | % Distribution Zn |
|---|---|---|---|---|---|
| Pb Concentrate | 5.03 | 41.2 | 2.05 | 93.3 | 0.8 |
| Zn Concentrate | 23.16 | 0.18 | 58.20 | 1.9 | 98.4 |
| Zn Final Tailing | 71.81 | 0.15 | 0.16 | 4.8 | 0.8 |
| Feed | 100.00 | 2.22 | 13.70 | 100.0 | 100.0 |

EXAMPLE 11

A laboratory continuous locked cycle in steps described in the previous paragraph was carried out but with addition of depressant LS7 of the present invention. The depressant was added to the grinding step at a rate of 250 g/t. The results of the flotation test using LS7 are shown in Table 11.

TABLE 11

| Product | Weight % | Assays, % Pb | Assays, % Zn | % Distribution Pb | % Distribution Zn |
|---|---|---|---|---|---|
| Pb Concentrate | 2.81 | 74.06 | 1.05 | 93.4 | 2.0 |
| Zn Concentrate | 22.60 | 0.12 | 60.56 | 1.2 | 98.6 |
| Zn Final Tailing | 74.59 | 0.16 | 0.22 | 5.4 | 1.2 |
| Feed | 100.00 | 2.23 | 13.88 | 100.0 | 100.0 |

The use of depressant LS7 in Example 11 resulted in a significantly higher lead concentrate grade than that obtained without the additions of the depressant in Table 10. This indicated that pyrite, especially oxidized pyrite was rejected from both lead and zinc concentrate into the tailing in presence of the depressant. It is to be noted that the same amount of lead sulphide as in the conventional circuit was contained in approximately half the weight of concentrate with the use of LS7, thereby significantly increasing the grade and reducing the cost of lead recovery.

EXAMPLE 12

The ore used in the previous two tests of Examples 10 and 11 was treated in a commercial plant operating at a rate of 96 tonnes per hour. Plant tests were performed with and without additions of depressant LS7. The flowsheet and reagent addition patterns were similar to those described in Examples 10 and 11 above.

The results obtained in the commercial plant with and without LS7 depressant additions are shown in Table 12.

TABLE 12

| Depressant LS7 Additions g/t. | Product | Weight % | Assays, % Pb | Assays, % Zn | % Distribution Pb | % Distribution Zn |
|---|---|---|---|---|---|---|
| 0 | Pb Conc. | 5.03 | 38.84 | 1.60 | 85.3 | 0.6 |
| | Zn Conc. | 23.56 | 0.41 | 55.25 | 4.2 | 94.0 |
| | Zn Final Tailing | 71.41 | 0.35 | 1.05 | 10.5 | 5.4 |
| | Feed | 100.00 | 2.30 | 13.85 | 100.0 | 100.0 |
| 300 | Pb Conc. | 3.06 | 64.1 | 1.15 | 85.9 | 0.3 |
| | Zn Conc. | 25.14 | 0.97 | 55.10 | 9.9 | 92.4 |
| | Zn Final Tailing | 71.80 | 0.14 | 1.53 | 4.2 | 7.3 |
| | Feed | 100.00 | 2.46 | 14.99 | 100.0 | 100.0 |

It will be noted that a marked increase in lead concentrate grade was observable by the use of depressant LS7 with essentially no loss in lead recovery.

It has been shown by numerous examples conducted on a number of different massive sulphide ores that the depressant of this invention is highly superior to the conventional depressants commonly used in commercial operations.

Although the present invention has been described with reference to the preferred embodiment, it is to be understood that modifications and variations may be resorted to without departing from the spirit and scope of the invention, as those skilled in the art will readily understand. Such modifications and variations are considered to be within the purview and scope of the invention and the appended claims.

We claim:

1. A reagent for enhanced mineral separation of metal sulphides present in sulphidic ores, comprising the reaction product of:

(i) a mixture of quebracho and one member of the group consisting of: guar gum and dextrin, dissolved in water, and reacted in a first chemical reaction, adding thereto (ii) a water-soluble lignin sulphonate, and subjecting the mixture so obtained to a second chemical reaction, and finally adding thereto (iii) at least one member of the group consisting of: alkali metal cyanide, alkaline earth metal cyanide, water soluble metal sulphate, and a water soluble sulphite containing tetravalent sulphur atom, and subjecting the mixture so obtained to a third chemical reaction.

2. A reagent as claimed in claim 1, wherein said quebracho and said one member of the group consisting of dextrin and guar gum, are mixed in a ratio of 1±0.4 to 2±0.4, and the mixture is subsequently dissolved in water.

3. A reagent as claimed in claim 2, wherein said first chemical reaction is conducted at a temperature higher than 40° C.

4. A reagent as claimed in claim 1, wherein said lignin sulphonate in said second chemical reaction is added as a salt of at least one of the metals selected from the group consisting of: alkali metals and water soluble alkaline earth metals.

5. A reagent as claimed in claim 1, wherein said alkali metal cyanide in said third chemical reaction is sodium cyanide.

6. A reagent as claimed in claim 1, wherein said water soluble metal sulphate in said third chemical reaction is zinc sulphate.

* * * * *